United States Patent [19]

Spampinato et al.

[11] Patent Number: 6,061,257
[45] Date of Patent: May 9, 2000

[54] WHOLLY INTEGRATED PROTECTION FROM THE EFFECTS OF A SHORT CIRCUIT OF THE OUTPUT OF A FLYBACK CONVERTER

[75] Inventors: Sergio Tommaso Spampinato, Cantania; Donato Tagliavia, Acireale, both of Italy

[73] Assignee: STMicroelectronics S.r.l., Agrate Brianza, Italy

[21] Appl. No.: 09/405,674

[22] Filed: Sep. 24, 1999

[30] Foreign Application Priority Data

Sep. 28, 1998 [EP] European Pat. Off. .............. 98830568

[51] Int. Cl.[7] .................................................. H02M 3/18
[52] U.S. Cl. ................... 363/56; 363/21; 363/97
[58] Field of Search ................. 363/21, 55, 56, 363/97

[56] References Cited

U.S. PATENT DOCUMENTS

| | | | |
|---|---|---|---|
| 4,724,363 | 2/1988 | Buer | 315/307 |
| 4,763,238 | 8/1988 | Maige | 363/56 |
| 5,949,154 | 9/1999 | Williams | 307/64 |

FOREIGN PATENT DOCUMENTS

| | | |
|---|---|---|
| 0 211 765 | 8/1986 | European Pat. Off. . |
| 0 638 985 A1 | 8/1993 | European Pat. Off. . |
| 0 698 960 A1 | 8/1995 | European Pat. Off. . |
| 57-017037 | 1/1982 | Japan . |
| 97/12436 | 4/1997 | WIPO . |

*Primary Examiner*—Edward H. Tso
*Assistant Examiner*—Gary L. Laxton
*Attorney, Agent, or Firm*—Theodore E. Galanthay; Allen, Dyer, Doppelt, Milbrath & Gilchrist, P.A.

[57] ABSTRACT

A method and device of protection from the effects of a persistent short circuit of the output of a DC-DC flyback converter self-oscillating either at a variable frequency or functioning at a fixed frequency in a discontinuous manner is provided. The voltage induced from the current flowing in a secondary winding of a transformer on the auxiliary winding is rectified and filtered to power, during a steady state of operation, the control circuitry of the converter. The turning on of the power switch is driven during a start-up or recovery phase by a primary control loop, when the supply voltage of the control circuit reaches or is over a preestablished enabling threshold of the control circuit. A secondary control loop includes a photocoupler of the output error voltage to an input of the control circuitry to which a compensation capacitor is connected. An output short circuit condition is discriminated from a start-up or recovery condition by comparing the voltage present on the auxiliary winding with a preestablished threshold which is higher than the voltage that is induced on the auxiliary winding under a short circuit condition of the secondary winding. And, the voltage existing on the compensation capacitor is compared with a second threshold of value equal or close to the value of maximum charge of the compensation capacitor, within a time interval sufficiently delayed from the turn-off instant of the power switch.

12 Claims, 7 Drawing Sheets

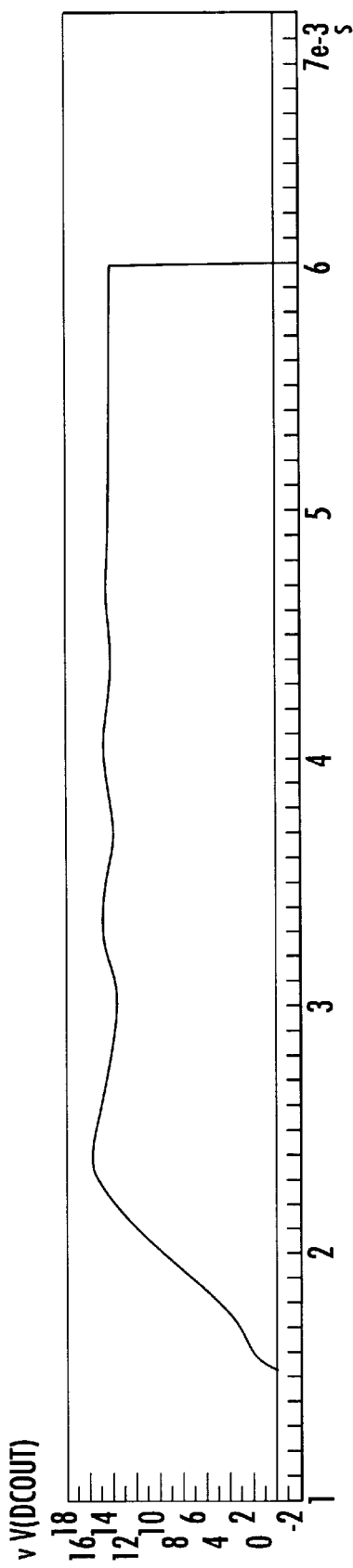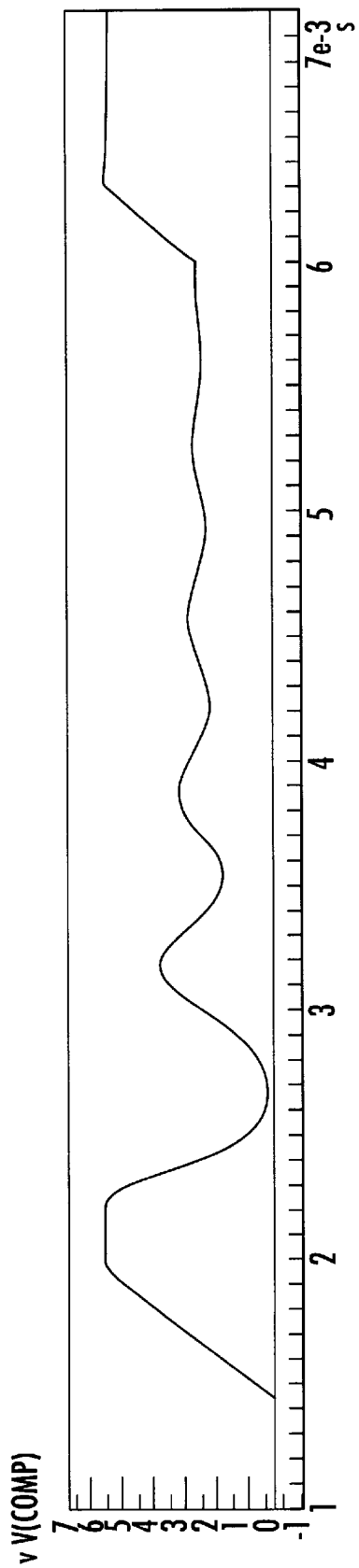
FIG. 5A.
FIG. 5B.

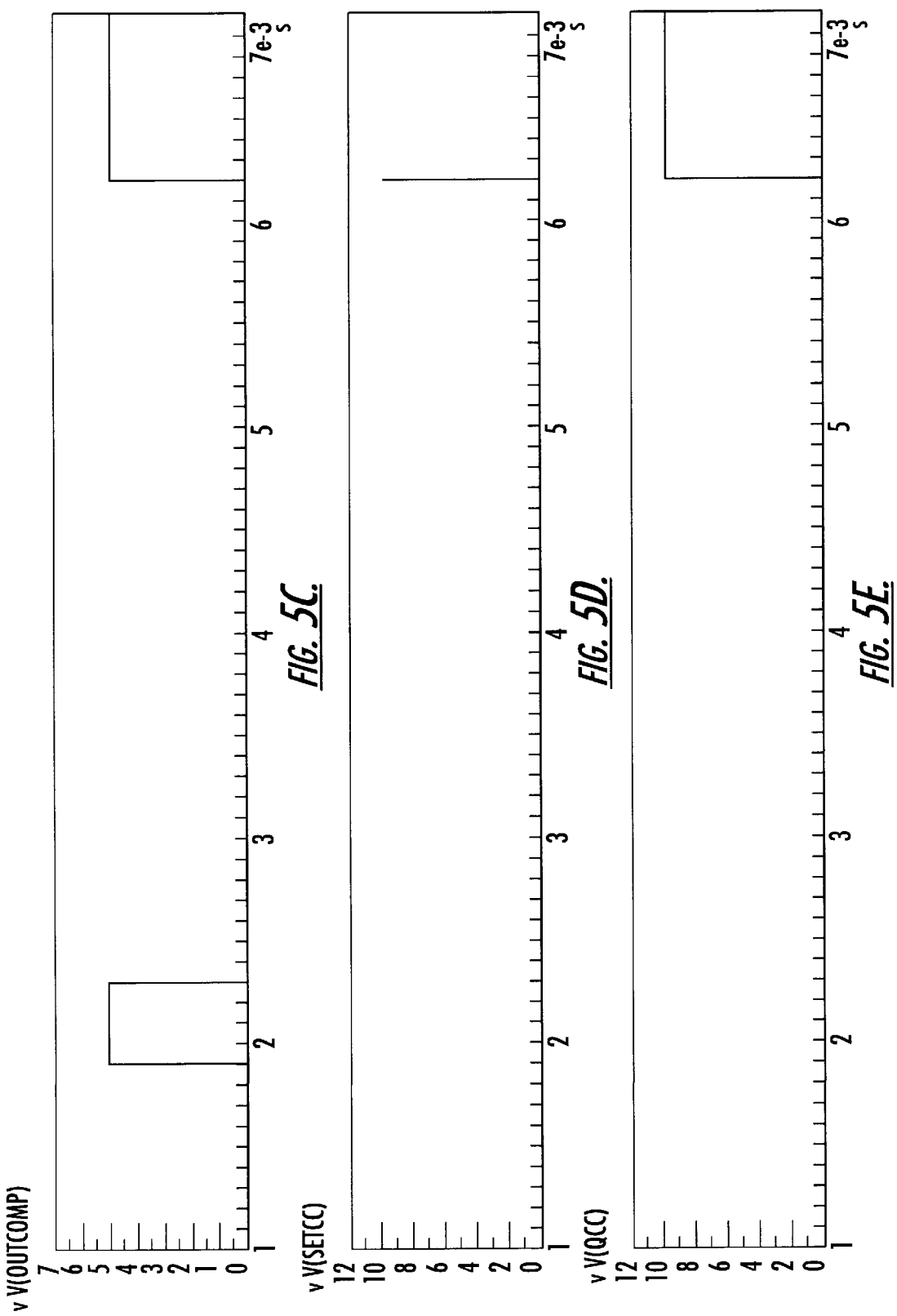

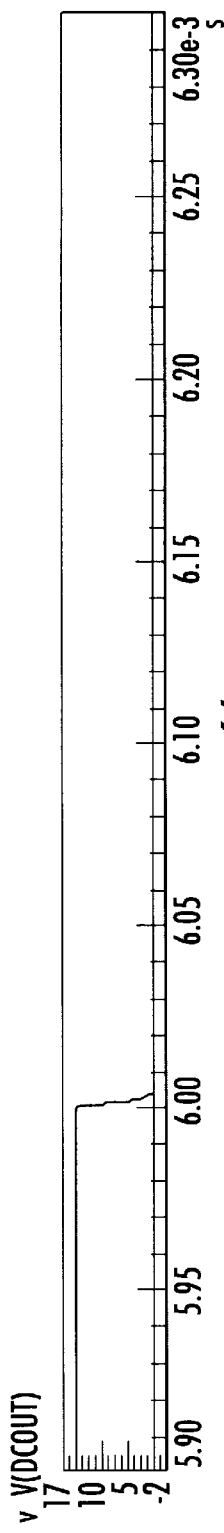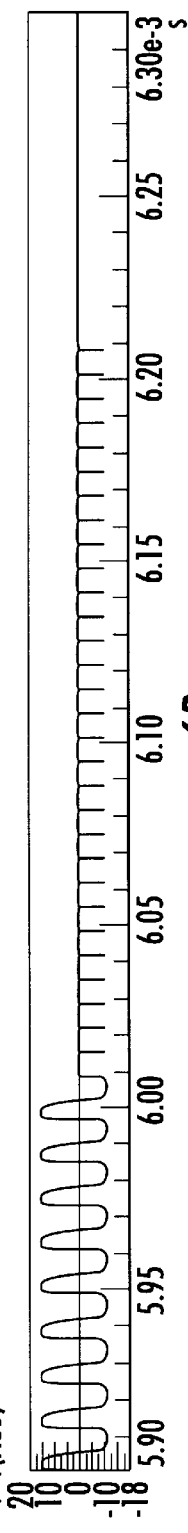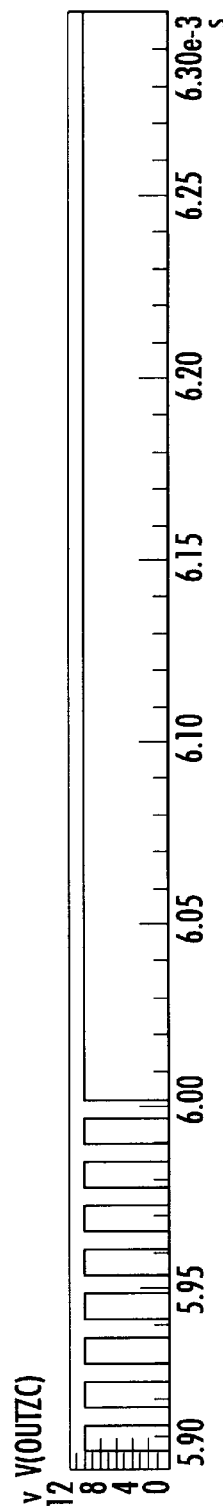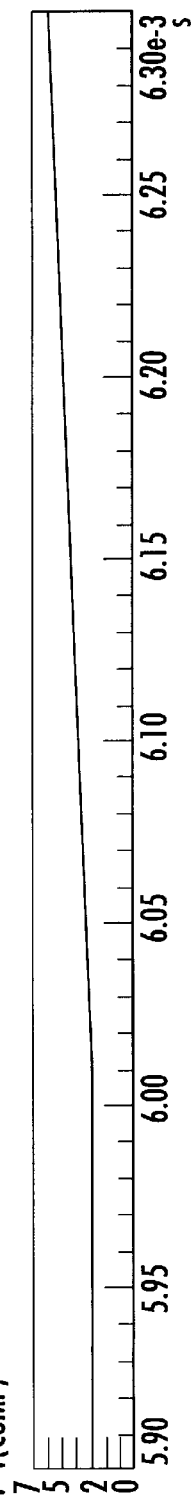

WHOLLY INTEGRATED PROTECTION FROM THE EFFECTS OF A SHORT CIRCUIT OF THE OUTPUT OF A FLYBACK CONVERTER

FIELD OF THE INVENTION

The invention relates to DC-DC flyback converters, and, more particularly, to DC-DC flyback converters which function in a discontinuous mode.

BACKGROUND OF THE INVENTION

The strive toward compactness along with new power consumption rules requires integrated devices to perform functions in an increasingly intelligent manner. FIG. 1 depicts a flyback DC-DC converter in which the majority of the power and control components are integrated in an unique package, monolithic or hybrid.

Flyback converters may be classified as:

a) SOPS (Self Oscillating Power Supply) converters in which the demagnetization of the transformer on an auxiliary winding Aus is detected (verification of a complete transfer to the secondary circuit of the energy accumulated while driving the switch connected to the primary winding N1, during a subsequent off phase of the switch evidenced by the current across the primary winding becoming null so that the successive turning on of the power switch takes place with a null current in the primary winding), to control the turning on of the power transistor (POWER). In this way, a "discontinuous" functioning mode is realized which is different from a continuous functioning mode in which the power switch is turned on with current still flowing in the primary winding, and different from the discontinuous functioning mode that is imposed by altering the switching frequency as a function of the power absorbed by the load connected to the converter output (secondary circuit of the transformer).

b) Fixed frequency converters which operate in a discontinuous mode under nominal operating conditions. However, under other conditions, such as for example, during start-up conditions and when recovering from short circuit events, they work in a continuous manner, unless the monitoring of the demagnetization is effected, typically on an auxiliary winding Aus, for disabling the functioning of the oscillator that establishes the fixed switching frequency.

One or the other configuration may be preferred depending on the application. In both cases there are control circuits CONTROL that carry out substantially the same functions. The integrated CONTROL circuit has a COMP pin, through which the information on the output voltage may be obtained by employing a photocoupler and to which an external capacitor, CCOMP, of a few hundreds nF is commonly coupled for compensating the output voltage control loop.

Moreover, such configurations include circuits that control the switching of the power transistor by employing a network operating on a pulse by pulse basis that limits the current in the power transistor, circuits that generate reference voltages REFERENCE, and histeresis circuits UNDERVOLTAGE. The UNDERVOLTAGE circuits define the start-up and recovery transients of the converter by intervening when the supply voltage VDD of the control circuitry, which typically is derived from the auxiliary winding Aus of the flyback transformer at steady state, is blown or accidentally drops below a certain threshold $VDD_{off}$. In these events, the undervoltage circuit switches off the whole device and maintains it in such a disabled state until the voltage reaches or exceeds a second threshold $VDD_{on}$ higher than the former threshold, $VDD_{off}$.

At power on, a charging current of the supply capacitor C2 (of the order of few tens of $\mu F$) may be provided for a line connected in some way to the Valim node, for example by a resistor of adequate power dissipating characteristic and value. In certain cases such a charging line (resistor) may be integrated and for these reasons it is not shown in FIG. 1.

In the control circuits of SOPS converters there is also a pin DEM, for synchronizing the turning on of the power transistor (POWER) under demagnetization conditions of the transformer. In contrast, in fixed frequency converters, the turn-on synchronization of the power transistor takes place by an oscillator that produces a dedicated clock signal and for this purpose, a pin, Osc, is often reserved for setting the switching frequency by an external capacitor or R-C group. Commonly, these type of control circuits do not include the presence of a DEM pin, unless the use of a network for verifying the demagnetization of the transformer and enabling the turn-on when this condition is satisfied, is contemplated. Verification of this condition is often implemented for preventing a continuous mode of operation, which would require an oversizing of some power components of the converter. Commonly, CLAMPER or SNUBBER circuits are used to limit the maximum voltage value on the power transistor and/or to avoid overlaps of the current and voltage waveforms during switching.

Apart from the above mentioned undervoltage block, known converters do not have other protections against short circuit condition of the converter's output. In practice, if the output voltage becomes null because of a short circuit on the OUT terminals, in the secondary winding (and therefore on the diode D1) there will be, during the off phase of the power transistor, a current whose maximum value is given by:

$$Isec_{cc}=(N1:N2)\ Ip_{max}$$

The voltage mirrored on the auxiliary winding AUS, coincides with the voltage on the secondary (which during a short circuit, will be equal to the voltage drop Vf on the diode D1), multiplied by their turn ratio (N3:N2), that is:

$$V_{AUS(cc)}=(N3:N2)\ V_{sec(cc)}=(N3:N2)\ Vf\ (D1)$$

This voltage is commonly less than the lower threshold $VDD_{off}$ of undervoltage, and in these conditions, the diode D2 during the off phase is nonconductive and therefore, during the successive switching cycles the current is supplied by the capacitor C2 which being no longer charged, discharges itself until dropping to threshold $VDD_{off}$ of undervoltage.

If the short-circuit condition of the output persists, the VDD voltage will oscillate between the $VDD_{on}$ and $VDD_{off}$ determining a functioning as illustrated in FIG. 2, with an average duty-cycle established by the currents absorbed by the integrated control circuit in these two functioning modes. However, the lower threshold of the undervoltage circuit may never be reached under short-circuit conditions, unless certain circuit arrangements are implemented in the converter scheme. The presence of parasitic inductances of the transformer cause some damped oscillations during the turn-off phase of the power transistor, whose maximum peak may be high enough to maintain a charge state of the C2 capacitance above the threshold $VDD_{off}$ of undervoltage, which keeps the device permanently turned on and subjects the power transistor to continuous and very demanding switching cycles. In certain situations, this may lead to the destruction of the device.

To prevent this, it is a common practice to add protecting components, external to the integrated circuit.

Known approaches have drawbacks. Firstly, the condition of short circuit is indirectly recognized by a discharging of the supply capacitor, with the consequent turning off of the device upon reaching the lower threshold of undervoltage. The power dissipated in such conditions is clearly tied to the charge and discharge transients of the supply capacitor. Secondly, it is necessary to use external components for implementing such a turn-off function. Indeed, the realization of an effective protection by a wholly integrated circuit appears very difficult because in these integrated circuits it is not possible to effect a correct control of the output voltage, and the short circuit condition may be indistinguishable from that of a normal start-up condition with a completely discharged output filter capacitor.

SUMMARY OF THE INVENTION

An object of this invention is to provide a wholly integrated circuit that implements a protecting function against the effects of a short circuit at the output of a DC-DC flyback converter.

This important objective is achieved, according to the present invention, by exploiting the exceptionally low mirrored voltage that is induced on the auxiliary winding of the flyback transformer during a short circuit event of the converter's output. By comparing the voltage existing on the auxiliary winding with the supply voltage of the control device, or with a reference threshold whose value is sufficiently higher than the voltage induced on the auxiliary winding under short circuit conditions, it is possible to discriminate between a short circuit condition and a start-up or recovery condition. Also, in cooperation with information obtained upon comparing the voltage on the terminals of the compensating capacitor of the secondary control loop that is commonly connected in parallel to the coupling phototransistor, it is also possible to discriminate between a short circuit condition and a start-up condition with a completely discharged output filtering capacitor.

By combining the information, it is possible to reliably discriminate a short circuit event from other possible operating conditions of the converter and thus permit an effective protection against the risk of damaging the integrated device, should the short circuit condition persist.

BRIEF DESCRIPTION OF THE DRAWINGS

The different aspects and advantages of the invention will become even more evident through the following description of an embodiment and by referring to the annexed drawings, in which:

FIGS. 5, 6 and 7 show the waveforms of significative signals, obtained by simulation.

DETAILED DESCRIPTION OF THE PREFERRED EMBODIMENT

The approach of the present invention will be more easily understood after further analyzing the effects of a short circuit on the waveforms of the voltage $V_{AUS}$ on the terminals of the auxiliary winding AUS of the flyback transformer of the converter. As already mentioned, if the converter output is in a short circuit condition, when the power switch in turned off, the voltage induced on the auxiliary winding of the transformer, apart from the initial oscillatory transient, stabilizes to a $V_{AUScc}$ value which is much lower than the voltage induced during the normal functioning of the converter. This value $V_{AUScc}$ is at least nominally higher than the supply voltage of the control circuitry of the integrated device that is typically derived therefrom by using a charging diode D2 and a supply capacitor C2 of a relatively large capacitance. Therefore, the invention is applicable to self-oscillating DC-DC flyback converters (SOPS) as well as to converters functioning at a fixed frequency, determined by an oscillator included in the control circuitry provided that the voltage $V_{AUS}$ on the terminals of the auxiliary winding of the transformer is detected.

Figure 1:
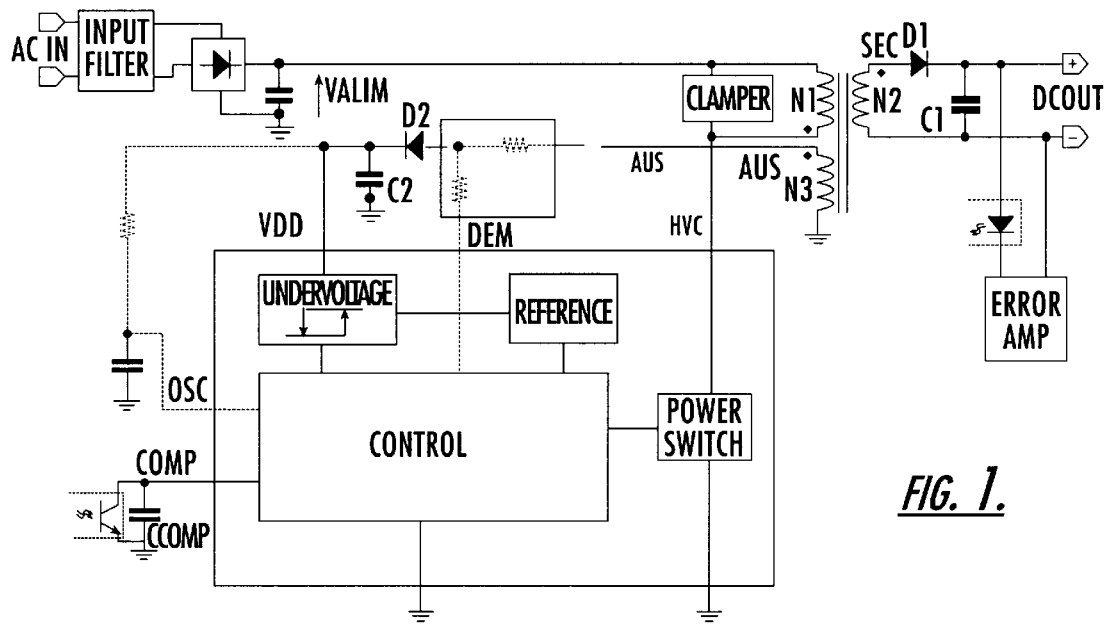
FIG. 1 is a basic diagram of a generic flyback converter (self-oscillating or fixed frequency)
Figure 2:
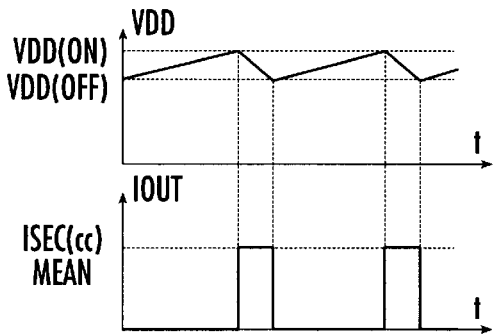
FIG. 2 shows the diagrams of the supply voltage of the control circuitry and of the average current flowing in the secondary winding of the flyback transformer under short circuit conditions of the output.
Figure 3:
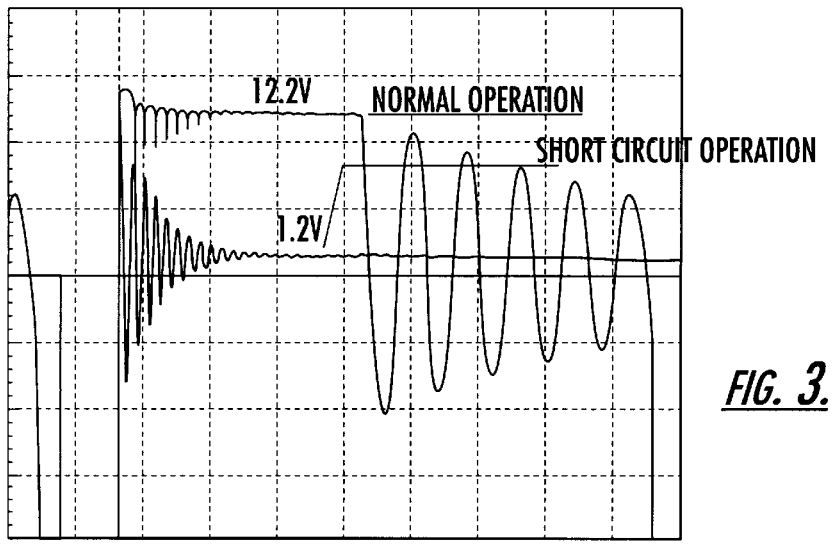
FIG. 3 shows the diagrams of the voltage on the auxiliary winding of the flyback transformer in case of normal operating condition and in case of short circuit of the output of the converter.

The diagrams of FIG. 3 refer to the case of a fixed frequency converter. The method of the invention may be implemented by modifying the architecture of the integrated device as depicted by way of example in the diagram of FIG. 4. By monitoring the voltage $V_{AUS}$ voltage on the auxiliary winding AUS of the transformer during a turn-off phase of the power switch, through a first comparator COMP1 whose reference threshold is Vref1 higher than $V_{AUScc}$, it is possible to discriminate a possible short circuit condition from a "normal" operating condition, even though this does not completely resolve the problem of discriminating the event from a start-up condition with a completely discharged output filter capacitor. Under an output short circuit condition, any protecting intervention would unduly interrupt the start-up transient, impeding the system from starting up.

This inability is effectively overcome by combining the outcome of the comparison of the voltage existing on the auxiliary winding with other information so that this combination may positively discriminate a condition of short circuit from a start-up, even when the output filter capacitance is totally discharged.

In a current mode type of control, as in implemented by the basic control circuit of the converter, there is a relationship between the error voltage VCOMP provided by photo-coupling the output of the error amplifier of the output voltage ERROR AMP to the CONTROL circuitry through the dedicated pin COMP and the current flowing in the power switch POWER. Therefore, there exists a maximum error voltage value $VCOMP_{(max)}$ error, tied to the maximum current that may flow through the power transistor, that limits the current on a pulse by pulse basis, therefore limiting the maximum power that may be transferred from the primary circuit to the secondary circuit.

When the integrated device is turned on and the $VDD_{on}$ threshold is reached, the compensating capacitor CCOMP is charged and during this charging transient the first switching of the POWER switch take place with gradually increasing current levels (soft start-up process). During this charging transient of the compensation capacitor CCOMP, the output filter capacitor C1 also at least partially charges, thus raising the voltage $V_{AUS}$ being induced on the auxiliary winding, by an amount sufficient for the voltage on the COMP pin to reach a level close to its maximum value after the $V_{AUS}$ voltage has already exceeded the Vref1 threshold.

Under these conditions, by the use of a second comparator COMP2 comparing the voltage on the compensation capacitor VCOMP with a second reference threshold Vref2 equal or close to the $V_{COMP_{max}}$ value, it is possible to ensure that the output of this second comparator COMP2 provides a perfectly discriminating information between a start-up condition and a short circuit condition, so to implement a wholly integratable protection without requiring additional pins and the use of external components.

Figure 4:
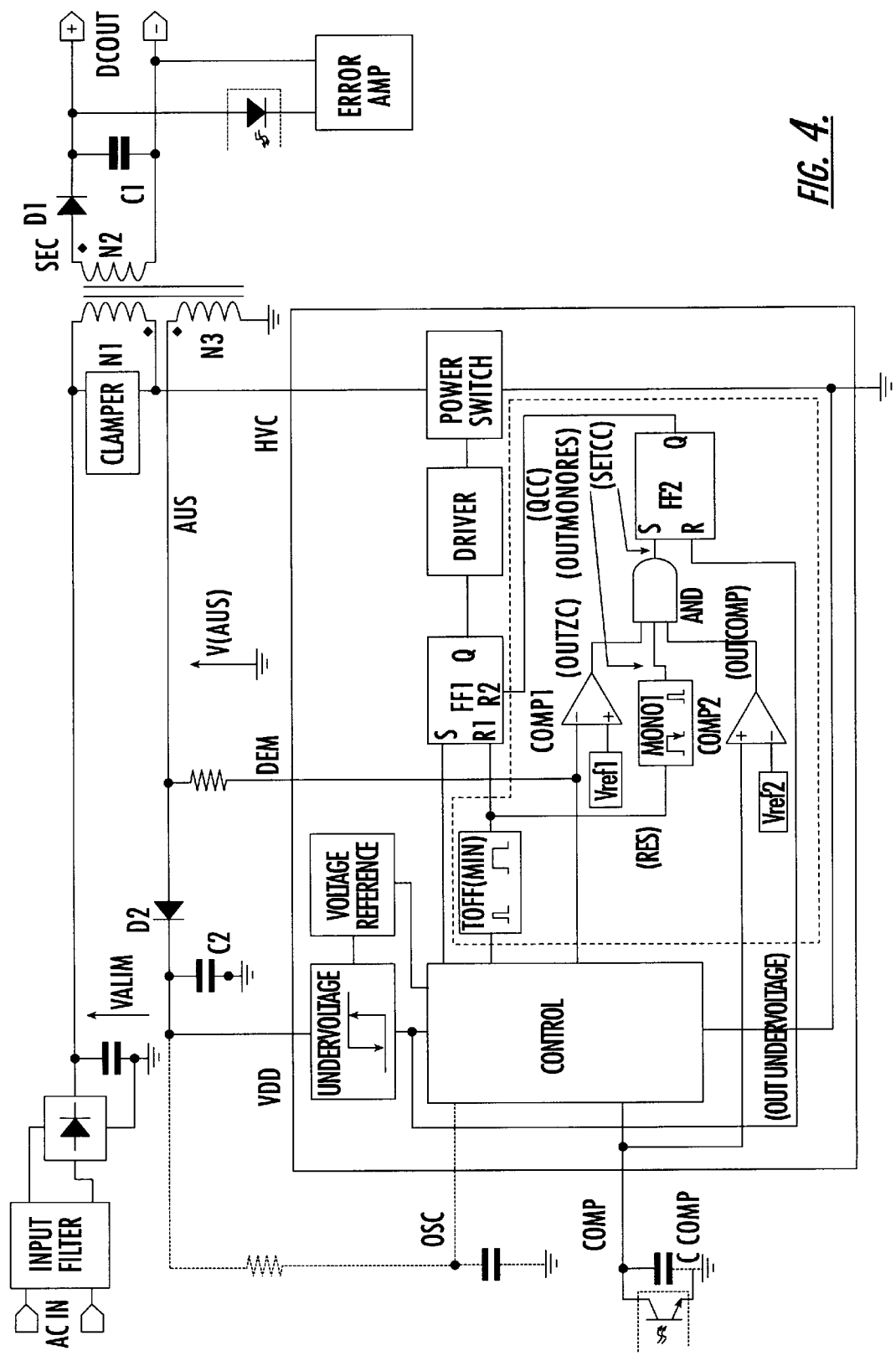
FIG. 4 is a basic diagram of a flyback converter (optionally usable as a self-oscillating converter or as a fixed frequency converter) incorporating the protecting circuit according to the present invention.
Figure 6E:
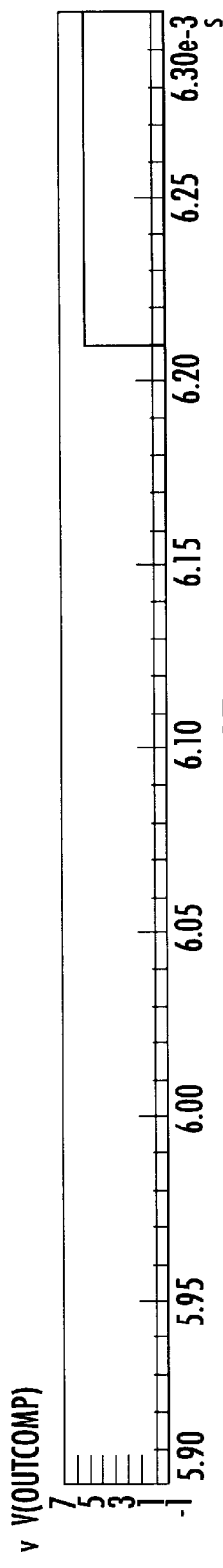
Figure 6F:
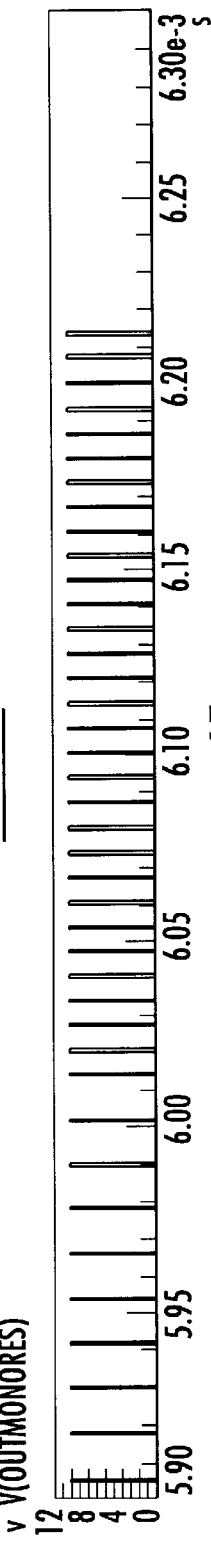
Figure 6G:
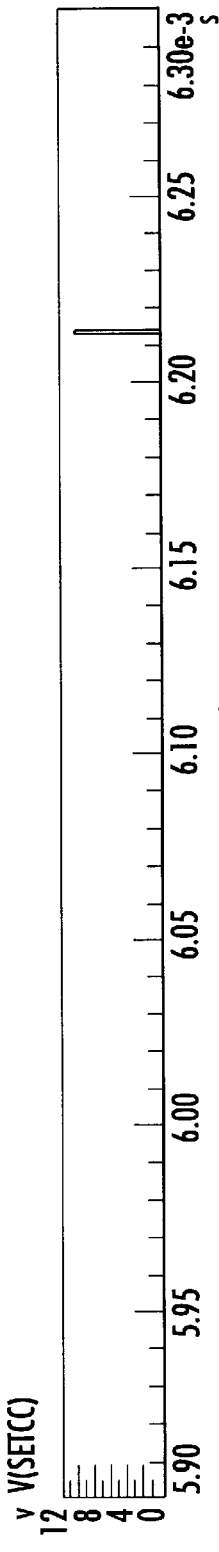
Figure 6H:
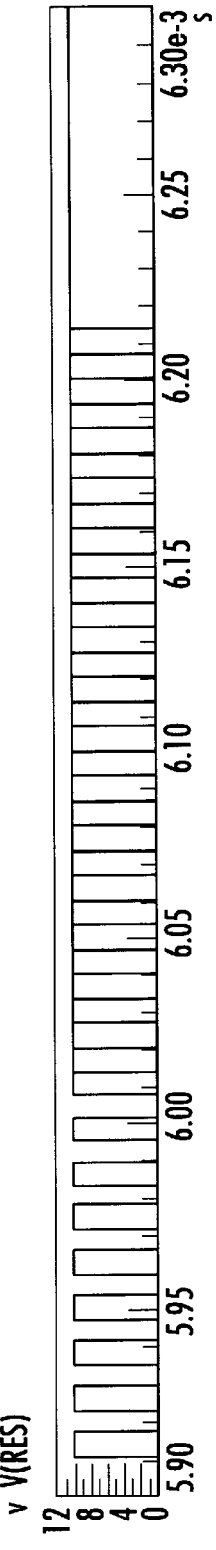

In the scheme of FIG. 4 the components and the functional blocks of the protecting circuit of the invention are identified by a dashed line perimeter, within the integrated converter device. In the illustrated example, integration of the power transistor that drives the primary winding of the flyback transformer is contemplated, the power transistor being integrated by using a so-called Smart Power technology which permits the realization of integrated power devices capable to withstand voltages that may reach or exceed a thousand Volts. However, it is evident that the protecting circuit of the invention may be integrated even using a low voltage fabrication technology for the device containing the control circuitry in case of converters employing externally connected discrete high voltage POWER switches.

According to the preferred embodiment shown in FIG. 4, the protecting circuit comprises also a $T_{OFF(min)}$ block whose function is to impose a minimum turn-off time and the sensing of a short circuit condition is carried out after such a masking interval, in a way to be sufficiently delayed from the turn-off instant of the power switch when oscillations on the $V_{AUS}$ voltage have decayed, in order to avert spurious comparisons by the two comparators COMP1 and COMP2. The minimum turn-off time or masking interval may be fixed so to safeguard a correct functioning of the converter at its typical switching frequencies.

The signal comparisons by the two comparators COMP1 and COMP2 are performed within a definite time interval, precisely determined by the monostable circuit MONO1. Such time interval immediately follows the instant that defines the turn-off time and is sufficiently short to guarantee that the turn-off condition of the power switch be verified under all conditions.

The logic combination of the signals existing on the outputs of the two comparators COMP1 and COMP2 performed through the AND gate during the interval of time defined by the monostable circuit MONO1, after the masking interval defined by the $T_{OFF(min)}$ circuit, ensures that only a short circuit condition of the comparator output produce a simultaneous high state of all the three signals so to cause the setting of the flip-flop FF2 and thereby a stable condition of a high logic value of the flip-flop FF2, a condition that keeps the POWER switch turned off by keeping the driving flip-flop FF1 in a reset state.

When the VDD voltage supply drops under of the lowest undervoltage threshold, the flip-flop FF2 is reset allowing for a new start-up transient. If the short circuit condition persists, the device will be enabled to function only during the charging transient of the compensation capacitor CCOMP. However, such a time interval will be far shorter than the charging transient of the supply capacitor C2 (at least an order of magnitude less) during which, by contrast, the known converters remain active, thus providing for a remarkable reduction of the average power dissipation.

Moreover, the wholly integratable circuit of the invention guarantees an automatic start-up of the converter once the short circuit condition ceases to exist, if compared to protecting devices based on the use of latches whose reset may be made only by disconnecting the converter from the mains.

Figure 7:
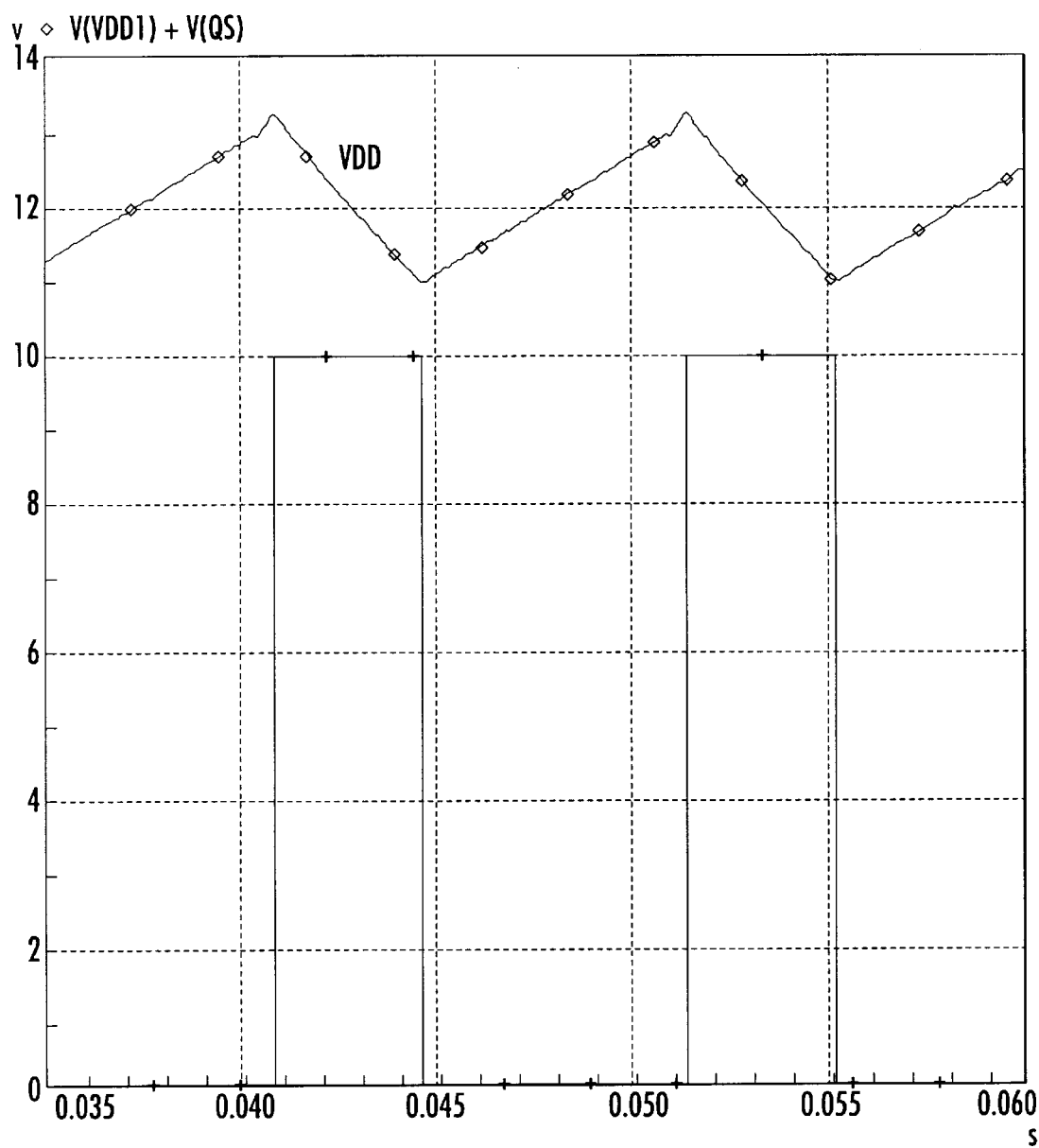

FIGS. 5 and 6 show operation diagrams of a simulation of the protecting circuit of the invention. The diagrams refer to the case of normal functioning of the converter loaded with a 2 ohm resistor for an output power of about 100 watt, and illustrate a start-up phase up to reaching a steady state of operation. Thereafter a short circuit condition is imposed (at the instant t=6 ms in the diagrams of FIGS. 5 and 6) to verify the effectiveness of the intervention of the protecting circuit of the invention. FIG. 7 highlights the waveforms of the supply voltage VDD and of the output of the FF2 flip-flop of the protecting circuit in a persisting short circuit condition of the converter output.

The protecting circuit of the invention may be easily integrated in different architectures of converter's control circuits. The invention is useful and applicable to an ample range of flyback converters, as mentioned above. The protection of the integrated device from a short circuit does not require the use of any additional external component or of any pin in the case of SOPS or fixed frequency converters which already implement a sensing of the voltage $V_{AUS}$ through a dedicated pin DEM in SOPS or by engaging a pin in fixed frequency converters and in which there is not a verification of the demagnetization of the flyback transformer for preventing a continuous mode of operation.

The power consumption of the converter under short circuit conditions is remarkably reduced by the protection circuit of the invention. This helps in complying with even more stringent specifications toward a maximization of power consumption that may be enacted in the future.

That which is claimed is:

1. A method of protecting a DC-DC flyback converter from a short circuit, the DC-DC flyback converter self-oscillating either at a variable frequency or functioning at a fixed frequency in a discontinuous manner, the DC-DC flyback converter including a transformer for storing and transferring energy to a load, and having primary, secondary and auxiliary windings, the primary winding being driven by a power switch, the auxiliary winding synchronizing the turning on of the power switch under a zero current condition in the primary winding when self-oscillating at a variable frequency, a voltage induced on the auxiliary winding from a current flowing in the secondary winding is rectified and filtered to power a control circuit during a steady state of operation, the turning on of the power switch being driven during a start-up or recovery phase by a primary control loop when the supply voltage of the control circuit reaches or is over a preestablished enabling threshold of the control circuit, a secondary control loop comprising an output error voltage being photocoupled to an input of the control circuit to which a compensation capacitor is connected, the method comprising the steps of:

comparing the voltage present on the auxiliary winding with a first threshold of a value which is higher than the voltage that is induced on the auxiliary winding under a short circuit condition of the secondary winding, to produce a first comparison signal;

comparing the voltage present on the compensation capacitor with a second threshold of a value substantially equal to the value of maximum charge of the compensation capacitor, to produce a second comparison signal;

logically combining the first and second comparison signals during a time interval sufficiently delayed from a turn-off instant of the power switch to discriminate an output short circuit condition from a start-up or recovery condition;

disabling a turning on of the power switch in response to the output short circuit condition.

2. A method of protecting a self-oscillating DC-DC flyback converter from a short circuit, the DC-DC flyback converter including a transformer for storing and transferring energy to a load, and having primary, secondary and auxiliary windings, the primary winding being driven by a power switch, the auxiliary winding synchronizing the turning on of the power switch under a predetermined condition, a primary control loop controlling the turning on of the power switch during a start-up or recovery phase when a supply voltage of a control circuit is equal to a greater than a preestablished enabling threshold of the control circuit, a secondary control loop comprising an input of the control circuit, to which a compensation capacitor is connected, being coupled to an output error voltage, the method comprising the steps of:

comparing the voltage present on the auxiliary winding with a first threshold to produce a first comparison signal;

comparing the voltage present on the compensation capacitor with a second threshold to produce a second comparison signal;

logically combining the first and second comparison signals during a time interval to discriminate an output short circuit condition from a start-up or recovery condition;

disabling a turning on of the power switch in response to the output short circuit condition.

3. A method according to claim 2, wherein the time interval is sufficiently delayed from a turn-off instant of the power switch.

4. A method according to claim 2, wherein the first threshold is higher than the voltage that would be induced on the auxiliary winding under a short circuit condition of the secondary winding.

5. A method according to claim 2, wherein the second threshold is a value substantially equal to a maximum charge of the compensation capacitor.

6. A DC-DC flyback converter functioning in a self-oscillating mode of a variable frequency or at a fixed frequency in a discontinuous manner, the DC-DC flyback converter comprising:

a flyback transformer for storing and transferring energy to a load, the flyback transformer comprising primary, secondary and auxiliary windings;

a power switch for driving the primary winding and for being synchronized by the auxiliary winding to turn on under a condition of null current in the primary winding when operating in a self-oscillating mode at a variable frequency;

a control circuit;

a charging device and a supply capacitor for providing a supply voltage to the control circuit, the charging device charging the supply capacitor at a voltage that is induced on the auxiliary winding by current flowing in the secondary winding;

a primary control loop for turning on the power switch when the supply voltage of the control circuit reaches or exceeds a preestablished threshold;

a secondary control loop comprising a photocoupler for coupling an output error voltage to an input of the control circuit, a compensation capacitor connected between the input of the control circuit and ground, a driving flip-flop which is set and reset by the control circuit, and a driver connected between the driving flip-flop and the power switch; and short circuit detection and protection means for detecting a short circuit condition of an output of the DC-DC flyback converter and for protecting the DC-DC flyback converter from the effects of the short circuit condition, the short circuit detection and protection means being integrated with the control circuit and comprising a first comparator for comparing the voltage present on the auxiliary winding with a first threshold which is greater than a voltage that is induced on the auxiliary winding during a short circuit condition of the secondary winding, a second comparator for comparing a voltage present on the compensation capacitor with a second threshold which is substantially equal to a maximum charging voltage of the compensation capacitor, a first monostable circuit connected to a power-switch-turn-off output node of the control circuit for establishing a minimum duration of an off phase of the power switch, the first monostable circuit driving a first reset input of the driving flip-flop, a second monostable circuit connected to the first monostable circuit, a logic gate having inputs connected to the second monostable circuit and to outputs of the first and second comparators, and for establishing a time interval wherein a coincidence of conditions verified by the first and second comparators is asserted, immediately following a masking interval of the minimum duration of the off phase of the power switch, and a second flip-flop having a set input connected to an output of the logic gate, a reset input driven by a signal produced by the primary control loop and an output connected to a second reset input of the driving flip-flop.

7. A DC-DC flyback converter which functions in a self-oscillating mode, the DC-DC flyback converter comprising:

a flyback transformer for storing and transferring energy to a load, the flyback transformer comprising primary, secondary and auxiliary windings;

a power switch for driving the primary winding and for being synchronized by the auxiliary winding to turn on under a predetermined condition in the primary winding;

a control circuit;

a primary control loop for turning on the power switch when a supply voltage of the control circuit is equal to or greater than a preestablished threshold;

a secondary control loop comprising an input of the control circuit for receiving an output error voltage, a compensation capacitor connected between the input of the control circuit and ground, and a driving flip-flop which is set and reset by the control circuit; and a short circuit protection circuit for protecting the DC-DC flyback converter from the effects of a short circuit condition, and comprising a first comparator for comparing the voltage present on the auxiliary winding with a first threshold, a second comparator for comparing a voltage present on the compensation capacitor with a second threshold, a first monostable circuit connected to an output node of the control circuit and driving a first reset input of the driving flip-flop, a second monostable circuit connected to the first monostable circuit, a logic gate having inputs connected to the second monostable circuit and to outputs of the first and second comparators, and a second flip-flop having a set input connected to an output of the logic gate, a reset input driven by a signal produced by the primary control loop and an output connected to a second reset input of the driving flip-flop.

8. A DC-DC flyback converter according to claim 7, wherein the first threshold is greater than a voltage that would be induced on the auxiliary winding during the short circuit condition.

9. A DC-DC flyback converter according to claim 7, wherein the second threshold is substantially equal to a maximum charging voltage of the compensation capacitor.

10. A DC-DC flyback converter according to claim 7, wherein the first monostable circuit connected to the output node of the control circuit is for establishing a minimum duration of an off phase of the power switch.

11. A DC-DC flyback converter according to claim 7, wherein the short circuit protection means is integrated with the control circuit.

12. A DC-DC flyback converter according to claim 7, further comprising a charging device and a supply capacitor for providing the supply voltage to the control circuit, the charging device charging the supply capacitor at a voltage that is induced on the auxiliary winding by current flowing in the secondary winding.

* * * * *